(12) United States Patent
Raich

(10) Patent No.: US 11,873,021 B2
(45) Date of Patent: Jan. 16, 2024

(54) STEERING COLUMN FOR A MOTOR VEHICLE

(71) Applicants: thyssenkrupp Presta AG, Eschen (LI); thyssenkrupp AG, Essen (DE)

(72) Inventor: Thomas Raich, Vandans (AT)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 0 days.

(21) Appl. No.: 18/102,251

(22) Filed: Jan. 27, 2023

(65) Prior Publication Data

US 2023/0242173 A1 Aug. 3, 2023

(30) Foreign Application Priority Data

Feb. 2, 2022 (DE) ..................... 10 2022 201 101.5

(51) Int. Cl.
*B62D 1/185* (2006.01)

(52) U.S. Cl.
CPC ................................... *B62D 1/185* (2013.01)

(58) Field of Classification Search
CPC .................................................... B62D 1/185
See application file for complete search history.

(56) References Cited

U.S. PATENT DOCUMENTS

| 1,031,637 | A | 7/1912 | Fischer | |
|---|---|---|---|---|
| 8,935,968 | B2 * | 1/2015 | Sugiura | B62D 1/185 74/493 |
| 2010/0130293 | A1 | 5/2010 | Eriksson et al. | |
| 2019/0061804 | A1 * | 2/2019 | Derocher | B62D 1/185 |
| 2020/0331513 | A1 * | 10/2020 | Bayer | F16C 33/36 |
| 2022/0161841 | A1 * | 5/2022 | Kreutz | B62D 1/183 |
| 2022/0242474 | A1 * | 8/2022 | Bayer | F16C 29/001 |

FOREIGN PATENT DOCUMENTS

| BE | 1029836 A1 * | 11/2022 | |
|---|---|---|---|
| BE | 1029838 A1 * | 11/2022 | |
| DE | 102017221004 A1 * | 5/2019 | ............. B62D 1/181 |
| DE | 102019201390 A1 * | 8/2020 | ............. B62D 1/181 |
| DE | 102020204802 A1 * | 10/2021 | |
| EP | 1065397 A1 * | 1/2001 | ............... B62D 1/16 |
| EP | 1167790 A1 * | 1/2002 | ............. B62D 1/185 |

(Continued)

*Primary Examiner* — Nicole T Verley
(74) *Attorney, Agent, or Firm* — thyssenkrupp North America, LLC

(57) ABSTRACT

A steering column may include a casing unit in which a steering spindle is mounted rotatably about a longitudinal axis extending in a longitudinal direction, and casing tubes that are adjustable telescopically relative to one another in the longitudinal direction. A roller guide with at least one bearing support can be displaced radially on a first of the casing tubes, and in which at least one roller is mounted rotatably about a roller axis that is transverse to the longitudinal axis. The roller can roll via its outer circumference in the longitudinal direction on a second of the casing tubes. A pretensioning device interacts with the bearing support to pretension the roller against the second casing tube. The bearing support may be guided on the first casing tube with an oblique inclination relative to the longitudinal axis, and the pretensioning device may apply an axial force to the bearing support.

13 Claims, 3 Drawing Sheets

(56) References Cited

FOREIGN PATENT DOCUMENTS

| | | | |
|---|---|---|---|
| EP | 2861879 B1 * | 7/2017 | ............... B62D 1/16 |
| JP | WO2007083536 A1 * | 1/2007 | |
| JP | 2007045276 A * | 2/2007 | |
| JP | 2007045276 A | 2/2007 | |
| JP | 2009180322 A * | 8/2009 | |
| WO | 2008147287 A1 | 12/2008 | |
| WO | WO-2019121330 A1 * | 6/2019 | ............. B62D 1/181 |
| WO | WO-2020193542 A1 * | 10/2020 | ............. B62D 1/185 |
| WO | WO-2020234224 A1 * | 11/2020 | ............. B62D 1/185 |
| WO | WO-2021151807 A1 * | 8/2021 | ............. B62D 1/181 |
| WO | WO-2021209410 A1 * | 10/2021 | |
| WO | WO-2021224199 A1 * | 11/2021 | ............. B62D 1/185 |

* cited by examiner

STEERING COLUMN FOR A MOTOR VEHICLE

CROSS REFERENCE TO RELATED APPLICATION

This application is a U.S. Non-Provisional that claims priority to German Patent Application No. DE 10 2022 201 101.5, filed Feb. 2, 2022, the entire content of which is incorporated herein by reference.

FIELD

The present disclosure generally relates to steering, including steering columns for motor vehicles.

BACKGROUND

A steering column for a motor vehicle may include a casing unit, in which a steering spindle is mounted so as to be able to rotate about its longitudinal axis. A steering wheel or another manual steering handle for the introduction of a steering command by the driver is attached at that end of the steering spindle which is at the rear in the direction of travel and faces the driver. The casing unit is retained by a supporting unit fastened to the vehicle body. By adjusting the casing unit relative to the supporting unit, the position of the steering wheel relative to the vehicle body can be set.

Longitudinal adjustment, in which the steering wheel can be adjusted backwards or forwards relative to the driver's position in the longitudinal direction, i.e. axially in the direction of the longitudinal axis, is enabled by a telescopic configuration of the casing unit. In a simple embodiment, such a telescopic arrangement can comprise an inner casing tube or internal casing tube, which dips into an outer casing tube or external casing tube in the longitudinal direction in an axially displaceable manner. In the case of a multiply telescopic system, one or more telescopic intermediate casing tubes may additionally be inserted between an outer and an inner casing tube. Apart from the longitudinal adjustment, a further advantage is that, in the event of a crash, the steering column can be collapsed in the longitudinal direction, as a result of which the steering column penetrating the interior of the passenger compartment and resulting in injuries to the occupants is effectively avoided.

In order to realize a telescopic arrangement, that is easily adjustable and at the same time has as little play as possible and is as rigid as possible, the prior art, for example US 2019/0061804 A1, describes arranging a linear roller guide between the adjustable casing tubes. Said linear roller guide preferably has multiple rollers, each of which is retained on a first casing tube, is mounted so as to be able to rotate about its roller axis which is transverse to the longitudinal axis, and can roll by way of its outer circumference in the longitudinal direction on a second, adjacent casing tube. For example, the first casing tube may be an outer casing tube, and the second casing tube may be an internal or intermediate casing tube arranged telescopically therein.

Since at least one roller is mounted in a bearing support which is movable in a radial direction relative to the first casing tube and is subjected to radial load by a pretensioning force from a pretensioning device, the roller can be pretensioned in rolling contact with the second casing tube without play.

The known pretensioning device comprises a setting screw which can be screwed radially into a threaded bore in the first casing tube and applies the radial pretensioning force elastically to the bearing support and thus to the roller via a spring element. It is advantageous here that the radially movable bearing support enables play to be eliminated, it being possible to maintain this elimination of play independently by virtue of the elastic pretension. However, it is disadvantageous that a relatively large installation space is necessary, as a result of which the pretensioning device can be arranged virtually exclusively on an external casing tube.

Thus a need exists for a smaller required installation space and a more flexible arrangement.

DETAILED DESCRIPTION

Figure 1:
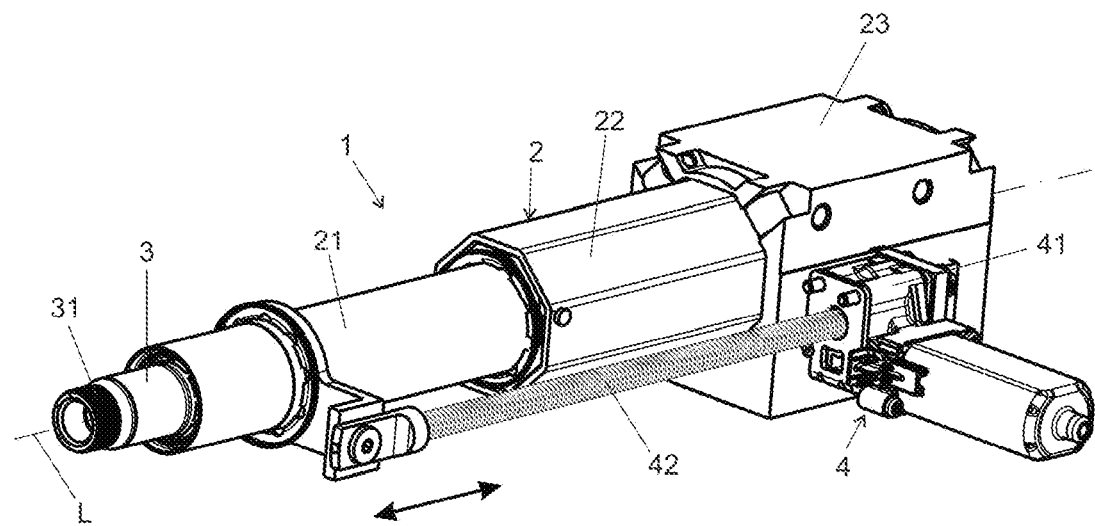
FIG. 1 is a schematic, perspective view of an example steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In the case of a steering column for a motor vehicle, comprising a casing unit, in which a steering spindle is mounted so as to be able to rotate about a longitudinal axis running in the longitudinal direction, and which comprises at least two casing tubes that can be adjusted telescopically relative to one another in the longitudinal direction, comprising a roller guide with at least one bearing support which can be displaced radially on a first casing tube, and in which at least one roller is mounted so as to be able to rotate about a roller axis which is transverse to the longitudinal axis, and the roller can roll by way of its outer circumference in the longitudinal direction on a second casing tube, wherein a pretensioning device interacts with the bearing support in order to pretension the roller against the second casing tube, it is provided according to the present disclosure that the bearing support is guided on the first casing tube with an oblique inclination towards the longitudinal axis, and the pretensioning device is designed to apply an axial force to the bearing support.

The present disclosure provides a guide device, by means of which the bearing support is guided relative to the first casing tube with an oblique inclination towards the longitudinal axis. In this respect, the bearing support on the first casing tube is preferably positively guided along a guide track, which is inclined relative to the longitudinal axis as seen in an axial direction, i.e. forms an angle of inclination α (alpha) where 0°<α<90°. The guide track may have a profile which is linear at least in certain portions, or else a curved profile. If the bearing support is moved in the longitudinal direction, i.e. axially relative to the first casing tube, the inclined positive guidance creates a radial movement component, wherein the roller is moved radially inwards or outwards transversely to its roller axis. In a manner corresponding to the deflection of the movement direction, an introduced axial force is also converted into a radial force which acts on the bearing support and can press the roller radially into rolling contact with the second casing tube. This makes it possible to realize a pretensioned roller guide without play.

Since, according to the present disclosure and as described, the pretensioning device comprises a deflection device, the pretensioning device can be designed primarily to generate an axial force. A suitable force generating device can be arranged in an axial direction, with the result that an axial structure with small dimensions in a radial direction can be realized, and overall a smaller installation space is required.

A further essential advantage of the axial structure according to the present disclosure of the pretensioning device is that the bearing support and the pretensioning device as a whole can be arranged inside a given casing tube cross section, for example inside the external casing tube in the case of the prior art example mentioned in the introduction. By contrast to the prior art, it is also the case that no radial interruption of the casing tube wall for the purpose of receiving the pretensioning device is necessary, and as a result no additional radial installation space on that side of the bearing support or of the first casing tube that is radially remote from the pretensioned roller is necessary. This makes it possible for the first time to set the roller guide of one or more intermediate or internal casing tubes lying inside an external casing tube in the telescopic arrangement free of play without taking up installation space outside of the external casing tube.

It is moreover advantageous that the pretensioning device makes it possible to provide a defined force transmission ratio, which specifies the force-distance relationship with which an axial force introduced via a given axial distance is converted to a radial force acting over a radial distance of the bearing support. In this context, it basically holds true that the product of force and distance is constant, with an angle of inclination α=45° corresponding to a transmission of 1:1. A shallower angle of inclination, α<45°, has the effect of a higher radial force relative to the axial force. This means a relatively low axial force is necessary to press the roller radially against the second casing tube with sufficient pretension. Correspondingly, a force generating device which has small dimensions and saves on installation space can be used.

It is possible, by virtue of the direction of inclination of the guide of the bearing support, to specify whether the axial force introduced subjects the bearing support to radially outward or inward loading. In this context, it holds true that, when the angle of inclination α—as seen in the direction of the axial force—widens, the bearing support is spread radially outwards by the axial force, that is to say the roller or the rollers are pretensioned radially outwards. Correspondingly, the rollers can be subjected to radially inward loading when the axial force is applied in the direction of a converging angle of inclination α.

It can preferably be provided that the bearing support and the first casing tube have corresponding, conically arranged guide surfaces. The conical guide surfaces, also referred to as wedge or cone surfaces, as seen in longitudinal section form a wedge-shaped arrangement, in which they are inclined towards the longitudinal axis at an angle of inclination α, which corresponds to half of the cone angle. The guide surfaces preferably have a respective inner and outer cone surface, which are aligned coaxially with the longitudinal axis and each of which preferably can extend at least over one circumferential portion. The cone surfaces are situated axially opposite one another on the first casing tube and on the bearing support in such a way that they can lie slidingly against one another at least in certain portions. For example, an outer cone, which is pressed into a corresponding inner cone of the bearing support by the axial force, may be formed on the first casing tube. This makes it possible to radially spread the bearing support, and the roller mounted on the bearing support or the rollers can be pretensioned radially outwards against an inner wall of the second casing tube. An advantage of the conical guide surfaces is that they can be manufactured with low outlay and can be incorporated in the bearing support and the casing tube. Moreover, the arrangement is functionally reliable and easy to assemble.

It is likewise conceivable and possible to arrange an inner cone on the first casing tube, and to arrange an outer cone, which dips into said inner cone, on the bearing support. The axial force makes it possible to subject the bearing support to radially inward loading, with the result that the roller or the rollers are pressed radially outwards against a second casing tube arranged inside the first casing tube.

The wedge-shaped or conical guide surface preferably has a linear or curved profile, that is to say the guide surface in cross section follows a linear profile or a curved profile. Consequently, the pretensioning behaviour of the arrangement according to the present disclosure can be easily adapted to requirements.

It is advantageously possible that at least one guide surface is plastically formed on the casing tube. A conically arranged guide surface can be created in one piece on a casing tube by plastically forming the tube wall, for example by cold or hot forming, such as pressing, forging, peening or the like. The casing tube, at least in the region of the guide surface, may preferably be made from a metallic material, preferably steel, which enables efficient plastic forming. An advantage of plastic forming is the low production outlay. Moreover, advantageous material hardening can be induced. If appropriate, reworking can be effected, for example by grinding or the like.

It may be provided that at least one guide surface is formed on the outside of an inner casing tube or on the inside of an outer casing tube. A respectively corresponding guide surface may accordingly be arranged on the inside or outside of a bearing support. In terms of easy and reliable construction and low manufacturing outlay, it is advantageous for a guide surface to be formed respectively in one piece on the casing tube and/or on the bearing support, for example in the form of a cone surface or wedge surface.

One advantageous embodiment can be effected in that the bearing support has a ring-shaped form, and at least in certain portions is arranged coaxially with the longitudinal axis. The bearing support may, for example, comprise a guide surface which is continuous all around the circumference or guide surfaces formed in certain portions, for example like cone surfaces or wedge surfaces described above. In this respect, an inner cone can be realized, with the result that the bearing support is radially widened or spread by the corresponding outer cone, which is subjected to loading by the axial force, on the first casing tube, and the roller or the rollers are pretensioned radially against the inner wall of a second casing tube surrounding the first casing tube. In order to enable the radial widening required for this, the bearing support may have a radially deformable ring support or support body. To that end, the bearing support may have an open ring shape, i.e. a ring support or support body that is interrupted in the circumferential direction. The bearing support may, for example, have a C-shaped basic form, or segment-like ring portions. The bearing support may preferably be elastically deformable per se, with the result that the free limbs can be bent radially inwards or outwards, so that the diameter of the bearing body can be modified. In each case, one, or preferably more, rollers may be mounted on one bearing support or be distributed over multiple bearing supports, preferably distributed over the circumference. A ring-shaped bearing support can be assembled with low outlay, with the rollers and the guide surfaces already being optimally positioned when being placed onto the first casing tube.

In addition or as an alternative to an interruption, the ring body or support body may comprise at least one circumferential portion which is continuous in the circumferential direction but deformable, for example by virtue of a portion thinned out in the manner of a film. This likewise enables the diameter of the bearing support to be modified for pretensioning purposes.

It may be provided that at least one roller is retained by the bearing support in a radially resilient manner. For example, the bearing support may have a radially elastic form per se, as in the preceding embodiment. As an alternative or in addition, it is also possible to arrange a rotary bearing of a roller radially elastically in the bearing support, with the result that the roller can be moved resiliently relative to the bearing support. Due to the radially resilient bearing the radial pretensioning force acting on the roller or the rollers can be generated by the bearing support, thus enabling a simple construction which can do without further force generating devices.

With preference, it can be provided that a plurality of rollers are distributed over the circumference. At least two, preferably three or more rollers, preferably distributed evenly over the circumference, offer the advantage of a uniform guide which is without play and is able to bear high loads, together with a high rigidity of the casing unit. Three rollers make it possible to advantageously centre the roller guide independently.

An advantageous embodiment can provide that an axially fixed, radially protruding counterbearing, against which a bearing support is axially supported, is attached to the casing tube. The bearing support can be supported on its axial side remote from the first casing tube against the counterbearing. An elastic pretensioning element, for example an axially acting spring element, may be inserted with pretension between the counterbearing and the associated bearing support, with the result that it applies its spring force as an axial force to the bearing support. In order to be able to reliably support the axial force, the counterbearing may be attached to the casing tube in a form fit, for example in the form of a retaining ring, which can be engaged with snap action in a form fit into a groove made in the circumference of the first casing tube. A spring element may be arranged axially between the counterbearing and the bearing support. This spring element forms an elastic force generating or pretensioning element and may preferably be ring-shaped and arranged coaxially with the longitudinal axis, for example in the form of a helical spring, plate spring, corrugated spring or the like, or else as a spring assembly composed of a plurality of axially stacked spring elements. Such an arrangement can be accommodated in an annular gap between the first and the second casing tube, with the result that an advantageously compact structure is enabled. In this respect, the first casing tube may be arranged inside the second casing tube, with the result that the roller or the rollers are pretensioned radially outwards against and in rolling contact with the inner side of the second casing tube. As an alternative, it is possible to pretension the rollers inwards against the outer side of a second casing tube arranged inside the first casing tube.

An advantageous refinement may be that two axial bearing supports are axially spaced apart on a casing tube in a mirror-imaged manner. In mirror planes of the mirror-imaged arrangement that are perpendicular to the longitudinal axis, the axial forces applied to the two bearing supports are directed towards one another. As a result, easy assembly by placing the bearing supports onto the free ends of the first casing tube is enabled. Since the two bearing supports, and therefore the two pretensioning devices, are axially spaced apart from one another, an advantageously high flexural rigidity of the casing unit can be realized.

It may advantageously be provided that the first casing tube is an inner casing tube, and the roller is pretensioned radially outwards against an outer casing tube. In that case, an inner casing tube forms a first casing tube within the meaning of the present disclosure, and may be an internal or intermediate casing tube which is arranged in and coaxially with an outer casing tube, which forms a second casing tube and may be an external casing tube or another intermediate casing tube. In any case, the roller or the rollers are pretensioned radially outwards against an inner wall of the external or intermediate casing tube, which surrounds the inner casing tube. The axial structure according to the present disclosure of the pretensioning device enables the roller guide of internal casing tubes to be pretensioned, this not being possible in the prior art. This advantageously makes it possible to increase the rigidity of the casing unit, even for multiply telescopic arrangements, or when no installation space outside of the outer casing tube should be taken up.

It is also conceivable and possible that the first casing tube is an outer casing tube, and the roller is pretensioned radially outwards against an inner casing tube. In this respect, the outer casing tube forms a first casing tube and may be an external casing tube or an intermediate casing tube, in which an internal or intermediate casing tube is arranged as second casing tube. This results in a broadened spectrum of possible uses.

It is possible that the casing unit has three or more telescopic casing tubes. As a result, a multiply telescopic system is formed, in which one or more intermediate casing tubes are arranged telescopically between the external casing tube and the internal casing tube. It is possible that one or more of the casing tubes each interacts according to the present disclosure with at least one bearing support. This also makes it possible to pretension internal roller guides, as a result of which the rigidity of the casing unit of multiply telescopic arrangements can be increased.

It may advantageously be provided that a bearing support comprises a moulded plastic part. The moulded plastic part may be in the form of a support body for the rollers and may comprise rotary bearings for the rollers. Such rotary bearings may preferably be formed in one piece, for example integrally moulded, for example in the form of bearing openings for journals of the rollers, or journals engaging in openings in the rollers, or the like. The plastic makes it possible to realize a smooth-running bearing system, for example for metallic journals or roller pins, which does not need maintenance. Moreover, a guide surface of plastic can slide reliably and easily on a corresponding guide surface on the first casing tube, which is preferably made from a metallic material such as steel or the like. A further advantage is that a sufficiently elastic plastic allows elastic deformation of the bearing support when the rollers are being pretensioned.

It is preferably possible for a bearing support to comprise or be in the form of a one-piece plastics injection-moulded part, which can be manufactured efficiently by plastics injection moulding.

The casing tubes may have a circular or polygonal cross section, for example triangular, quadrilateral, hexagonal or octagonal. In the case of a circular cross section, the guide surfaces may have cone lateral surface portions. In the case of a polygonal cross section, the guide surfaces may be wedge-shaped, and have planar portions.

In the various figures, identical parts are always denoted by the same reference signs and will therefore generally also each be named or mentioned only once.

Figure 2:
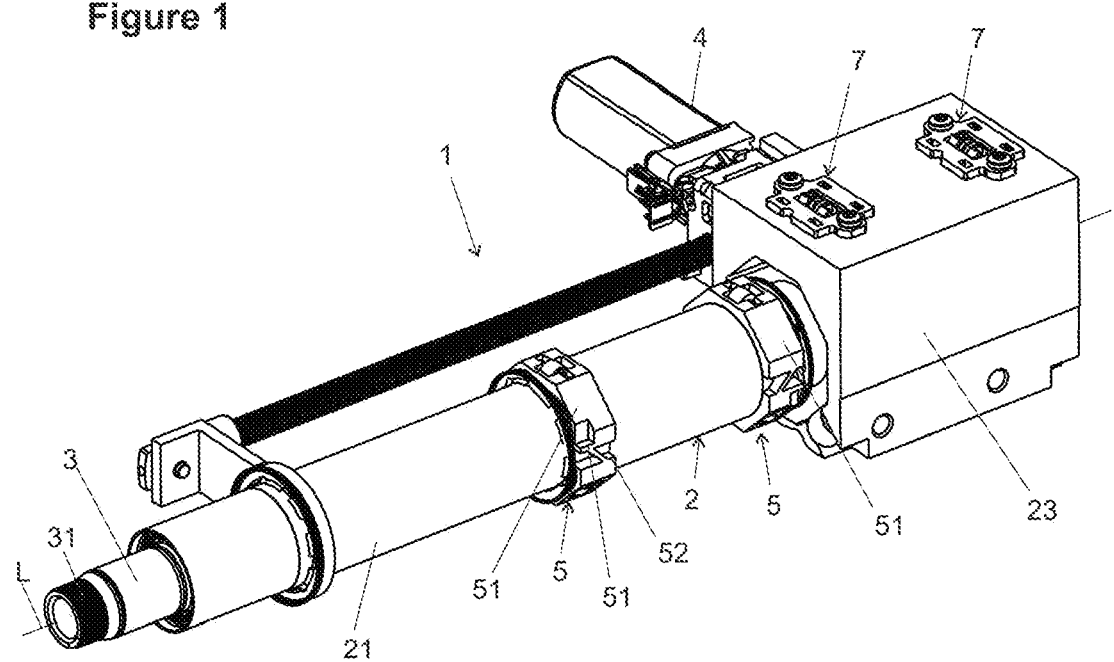
FIG. 2 is a partially open schematic view of the steering column according to FIG. 1.

FIG. 1 shows a steering column 1 according to the present disclosure, in a side view with respect to the direction of travel, with the direction of travel pointing to the right. FIG. 2 shows a perspective view obliquely from the front.

The steering column 1 has a casing unit 2, which has an internal casing tube 21 that extends in the longitudinal direction along a longitudinal axis L and is arranged in and coaxially with an intermediate casing tube 22 so as to be telescopic in the longitudinal direction, which intermediate casing tube for the one part is likewise arranged in and coaxially with an external casing tube 23 so as to be telescopic in the longitudinal direction, which external casing tube is also referred to as external casing 23 in short.

A steering spindle 3 is mounted in the casing unit 2 so as to be able to rotate about the longitudinal axis L. At is end which is at the rear in the direction of travel and points to the left in FIGS. 1 and 2, the steering spindle 3 has a fastening portion 31 for attaching a steering wheel, not illustrated here, or another manual steering handle.

An electromotive adjustment drive 4, which is in the form of a spindle drive, is arranged between the internal casing tube 21 and the external casing tube 23. Said adjustment drive comprises a drive unit 41 which is fixed to the external casing tube 23 and has a spindle nut—not explicitly illustrated here—which can be driven in rotation about the thread axis by an electric motor and in which a threaded spindle 42 engages. By way of its free end, the threaded spindle 42 is rotationally fixedly connected to the internal casing tube 21 so as to be fixed in the longitudinal direction. The rotary drive of the spindle nut makes it possible to move the threaded spindle 42 forward or back relative to the drive unit 41 depending on the direction of rotation, as indicated in FIG. 1 by the double-headed arrow. As a result, the internal casing tube 21 and the intermediate casing tube 22 can be retracted or extended telescopically relative to the external casing 23 in the longitudinal direction.

Figure 3:
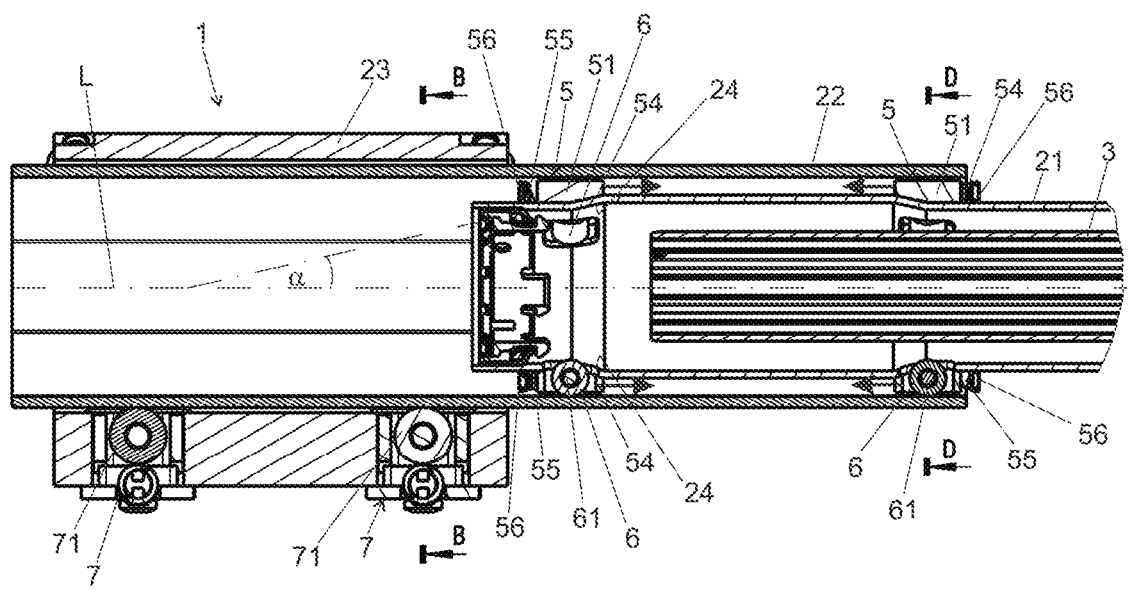
FIG. 3 is a partial longitudinal, sectional view through the steering column of FIG. 1.
Figure 4:
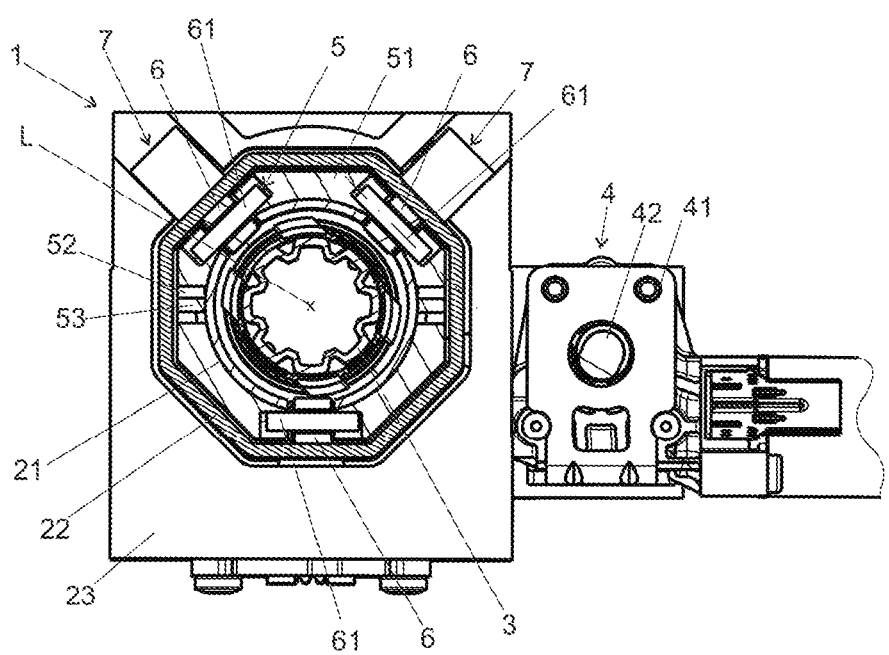
FIG. 4 is a cross-sectional view taken across line B-B in FIG. 3.

A total of two implementations of a pretensioning device 5 according to the present disclosure are attached between the internal casing tube 21 and the intermediate casing tube 22, these implementations having the same structure and being arranged axially spaced apart and with a mirror-imaged form with respect to a mirror plane perpendicular to the longitudinal axis L. For the purposes of better illustration, in FIG. 2, in the same view as in FIG. 1, the intermediate casing tube 22 has been left out, so that the interior can be seen. FIG. 3 shows a longitudinal section along the longitudinal axis L, and FIG. 4 shows a cross section D-D from FIG. 3.

A pretensioning device 5 has a respective bearing support 51, which is ring-shaped and arranged coaxially with the longitudinal axis L. The bearing support may have an open ring shape, for example C-shaped with a continuous gap 52. It is also possible—as illustrated in FIG. 2 and FIG. 4—for a closed ring shape to be formed, with the gap 52 being bridged in the circumferential direction by a circumferentially elastic compensating element 53, for example a deformable portion, a spring element or the like.

Three rollers 6 are mounted in the bearing support 5 so as to be able to rotate about their roller pins 61, which are tangential in relation to the circumference and transverse in relation to the longitudinal axis L. By way of their outer circumference, the rollers 6 lie against the inner wall of the intermediate casing tube 22 and can roll thereon in the longitudinal direction.

The bearing support 51 has a guide surface which is in the form of an inner cone 54 coaxial with the longitudinal axis L. Said inner cone lies axially against a corresponding guide surface formed on the internal casing tube 21 in the form of an outer cone 24. According to the present disclosure, these conical guide surfaces 54 and 24 have an oblique inclination towards the longitudinal axis L, specifically at the angle of inclination α depicted in FIG. 3, which corresponds to half of the cone angle of the inner cone 54 or of the outer cone 24, respectively.

On its axially outer end face remote from the inner cone 54, the bearing support 51 is axially supported in the longitudinal direction by a spring element 55 against a counterbearing 56 attached to the internal casing tube 21 so as to be fixed in the longitudinal direction. The counterbearing 56 may, for example, be formed by a radially outwardly protruding retaining ring which is attached to the internal casing tube 21 and for example can be latched into a retaining groove in a form fit, with the result that it is securely fixed to the intermediate casing tube 22 in the longitudinal direction.

The spring element 55 may preferably comprise a coaxial, ring-shaped, axially acting spring, for example a plate spring, corrugated spring or the like, or a spring assembly composed of a plurality of axially stacked springs.

The spring element 55 forms a force generating element and, to that end, is axially supported on the counterbearing 56 and pretensioned in such a way that it applies an elastic axial force to the bearing support 51. This axial force axially presses the inner cone 54 onto the outer cone 24 on the intermediate casing tube 22, as indicated in FIG. 4 by the arrows. The cone or wedge action converts the axial force into a radial force which radially spreads or widens the bearing support 51. In the process, the rollers 6 are subjected to radially outward loading and thus pretensioned against the inner wall of the intermediate casing tube 22 in rolling contact.

As can be seen in FIG. 3, two pretensioning devices 5 are arranged axially spaced apart in a mirror-imaged manner. The axial forces correspondingly act in opposite directions, as indicated by the arrows pointing towards one another.

In the example shown, the intermediate casing tube 22 has a polygonal, specifically octagonal cross section. The internal casing tube 21 with telescopic action therein has a circular cross section, but the cross section could also be octagonal.

Figure 5:
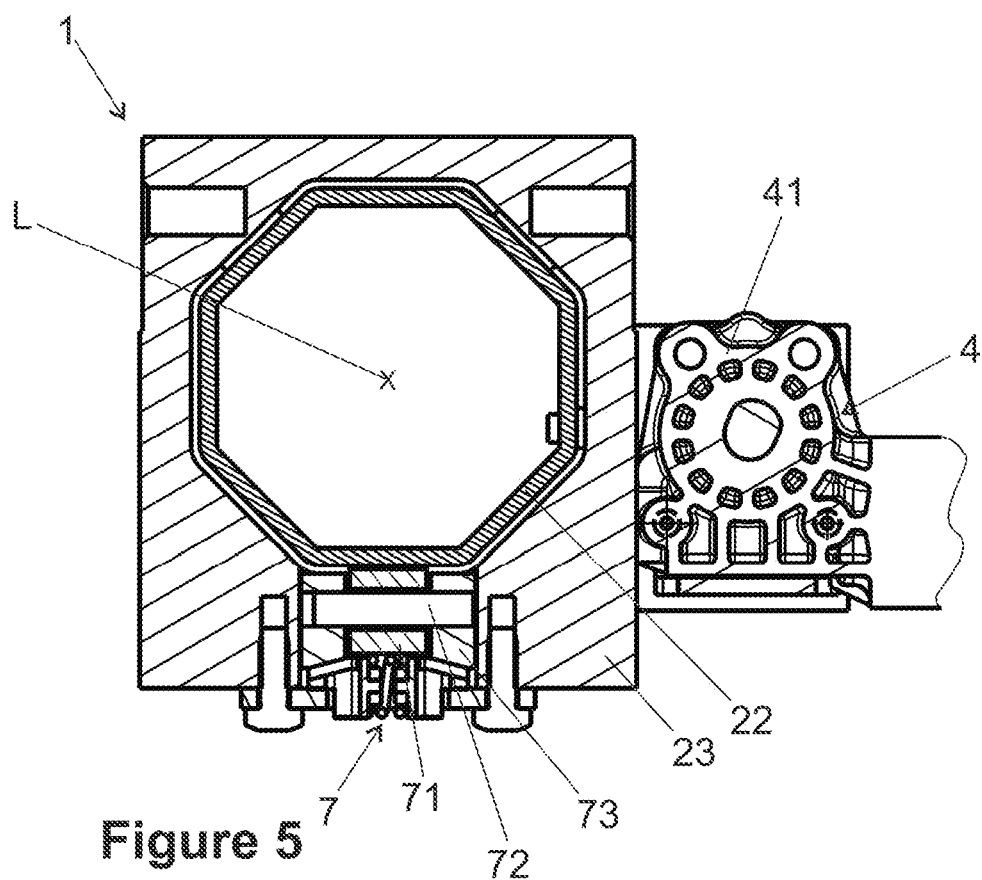
FIG. 5 is a cross-sectional view taken across line D-D in FIG. 3.

As illustrated in FIG. 3 and in the cross section of FIG. 5, the intermediate casing tube 22 is guided linearly in the external casing tube 23 likewise in a roller bearing arrangement. The latter comprises rollers 71 which are mounted so as to be able to rotate, in each case in a bearing support 73, about roller pins 72 that are transverse to the longitudinal direction L. Since the bearing support 73 is radially guided and spring-loaded in the external casing tube 23, a pretensioned roller bearing guide without play can be produced.

The bearing support 51 may preferably be made of plastic, preferably in the form of a one-piece plastics injection-moulded part. It may have a radially flexible form per se, with the result that it can be radially widened in order to apply the pretension to the rollers 6, as described above. The roller pins 61 may be made from a metallic material, for example steel.

The casing tubes 21, 22 and 23 may preferably be made from a metallic material, for example steel, aluminium alloys or the like. In this respect, the outer cone 24 may be formed in one piece on the internal casing tube 21 by plastic forming, for example by internal high-pressure forming or the like.

LIST OF REFERENCE SIGNS

1 Steering column
2 Casing unit
21 Internal casing tube
22 Intermediate casing tube
23 External casing tube
24 Outer cone
3 Steering spindle
31 Fastening portion
4 Adjustment drive
41 Drive unit
42 Threaded spindle
5 Pretensioning device
51 Bearing support
52 Gap
53 Compensating element
54 Inner cone
55 Spring element
56 Counterbearing
6 Roller
61 Roller pin
7 Roller bearing arrangement
71 Roller
72 Roller pin
73 Bearing support
L Longitudinal axis
α Angle of inclination

What is claimed is:

1. A steering column for a motor vehicle, comprising:
a casing unit in which a steering spindle is mounted rotatably about a longitudinal axis extending in a longitudinal direction, the casing unit comprising casing tubes that are adjustable telescopically relative to one another in the longitudinal direction;
a roller guide with a bearing support that is displaceable radially on a first casing tube of the casing tubes;
a roller mounted in the roller guide that is rotatable about a roller axis that is transverse to the longitudinal axis, wherein the roller is configured to roll via an outer circumference of the roller in the longitudinal direction on a second casing tube of the casing tubes; and
a pretensioning device that interacts with the bearing support to pretension the roller against the second casing tube,
wherein the bearing support is guidable on the first casing tube with an oblique inclination towards the longitudinal axis,
wherein the pretensioning device is configured to apply an axial force to the bearing support.

2. The steering column of claim 1 wherein the bearing support and the first casing tube have corresponding, conically arranged guide surfaces.

3. The steering column of claim 2 wherein at least one of the guide surfaces is plastically formed on the first casing tube.

4. The steering column of claim 2 wherein at least one of the corresponding, conically arranged guide surface is disposed on an outside of an inner casing tube of the casing tubes or on an inside of an outer casing tube of the casing tubes.

5. The steering column of claim 1 wherein the bearing support has a ring-shaped form and, at least in certain portions, is arranged coaxially with the longitudinal axis.

6. The steering column of claim 1 wherein the roller is retained by the bearing support in a radially resilient manner.

7. The steering column of claim 1 wherein the roller and a second roller are distributed over a circumference of the second casing tube.

8. The steering column of claim 1 wherein an axially-fixed, radially-protruding counterbearing, against which the bearing support is axially supported, is attached to the first casing tube.

9. The steering column of claim 8 comprising a spring element arranged axially between the counterbearing and the bearing support.

10. The steering column of claim 1 wherein the bearing support is a first bearing support, the steering column comprising a second bearing support, wherein the first and second bearing supports are axially spaced apart on the first casing tube in a mirror-imaged manner.

11. The steering column of claim 1 wherein the first casing tube is an inner casing tube, wherein the roller is biased radially outwards against the second casing tube, which is an outer casing tube.

12. The steering column of claim 1 wherein the casing unit comprises a third casing tube, with the first, second, and third casing tubes being telescopic.

13. The steering column of claim 1 wherein the bearing support comprises a moulded plastic part.

* * * * *